O. C. McCORMICK.
MACHINE FOR FORMING ARTICLES OF PLASTIC MATERIAL.
APPLICATION FILED DEC. 4, 1916.
1,268,984.
Patented June 11, 1918.
3 SHEETS—SHEET 2.
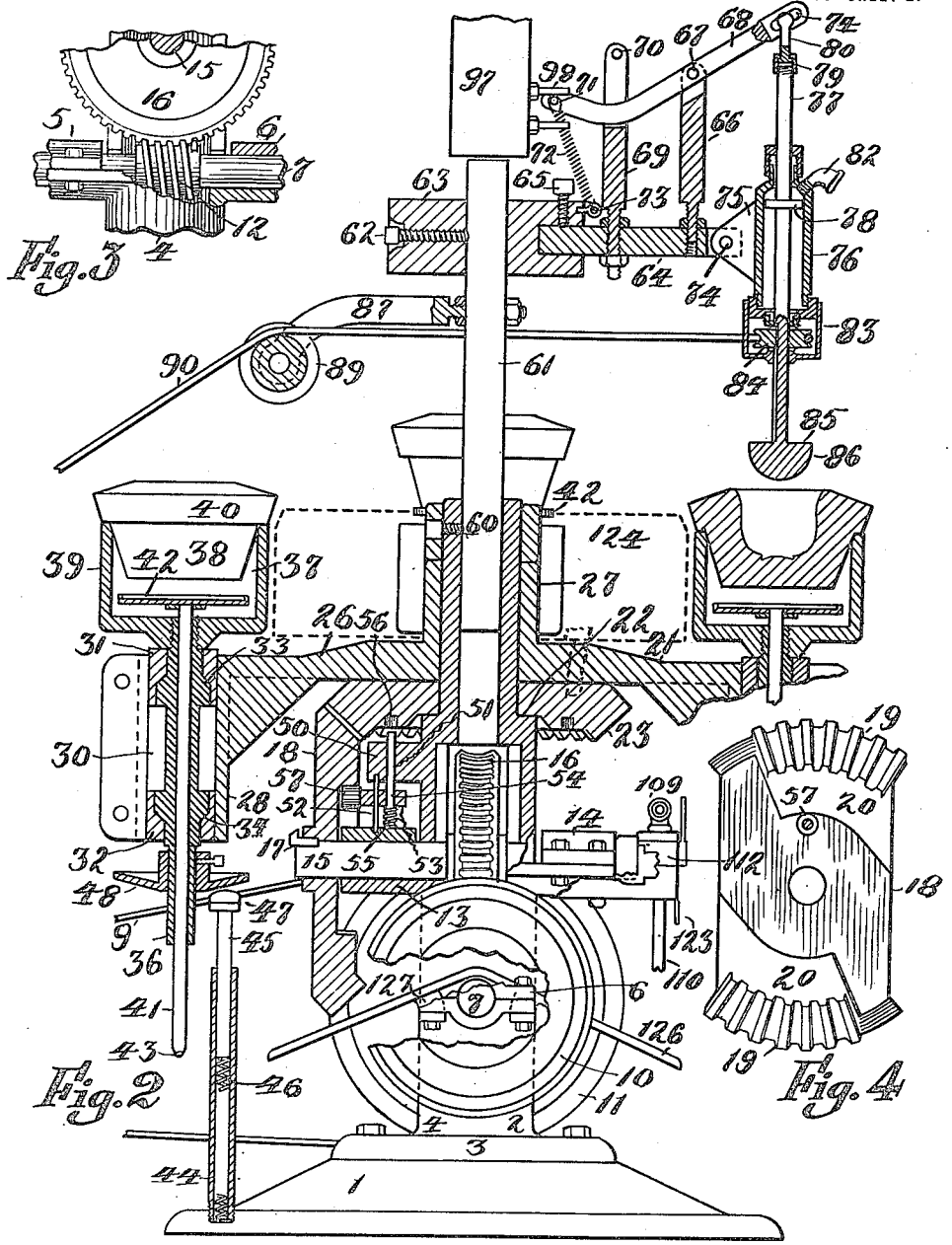
Inventor
Oscar C. McCormick,
By
C. E. Humphrey
Attorney O. C. McCORMICK.
MACHINE FOR FORMING ARTICLES OF PLASTIC MATERIAL.
APPLICATION FILED DEC. 4, 1916.
1,268,984.
Patented June 11, 1918.
3 SHEETS—SHEET 3.
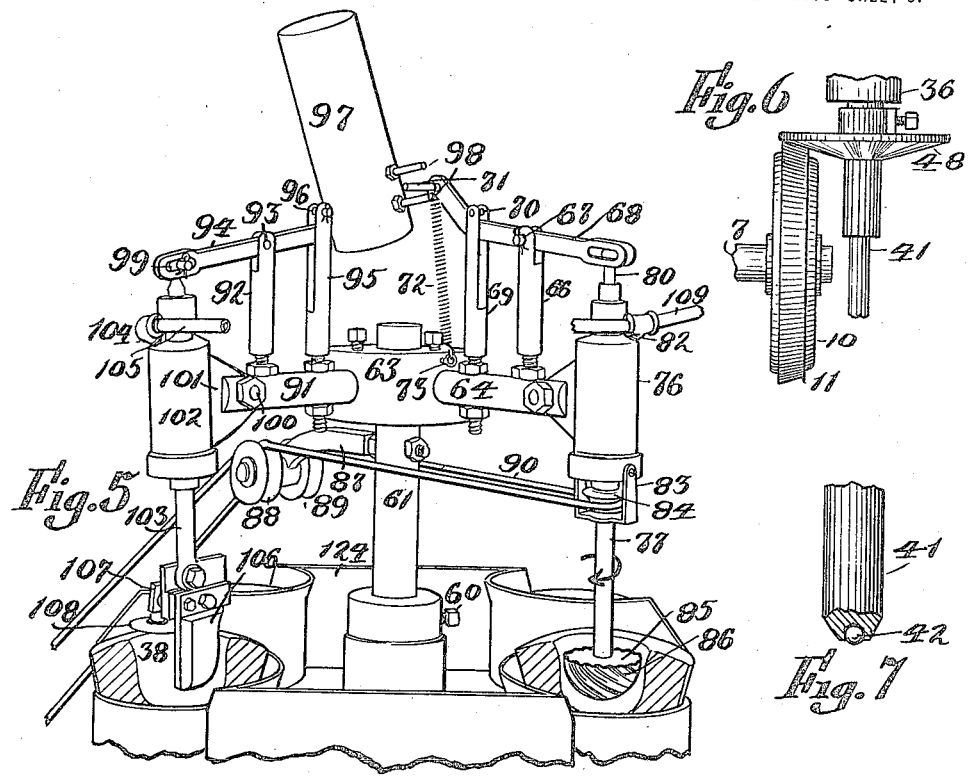
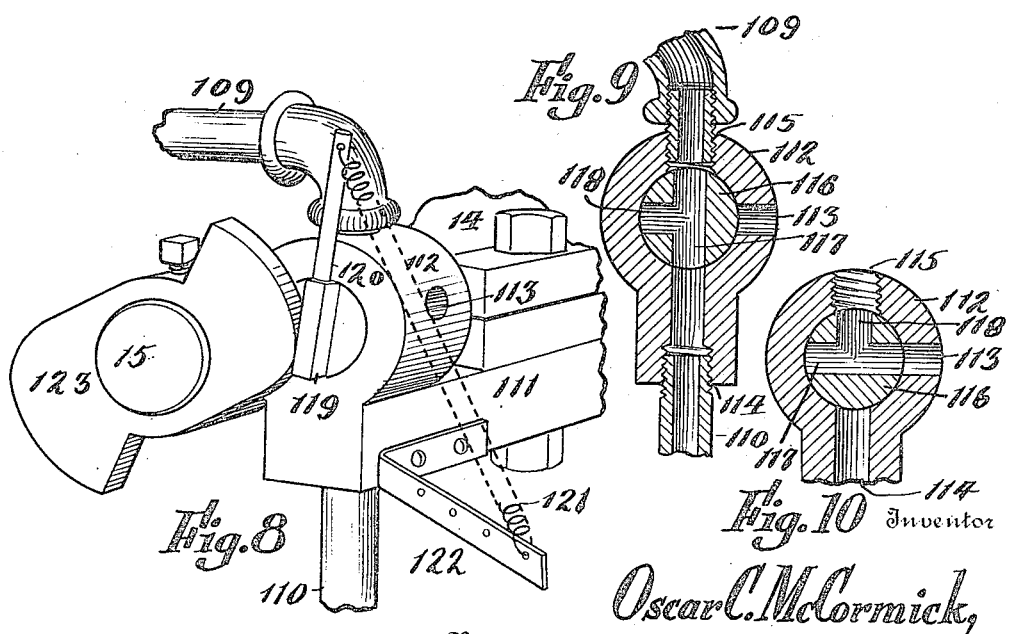
Inventor
Oscar C. McCormick,
By
C. E. Humphrey
Attorney

UNITED STATES PATENT OFFICE.

OSCAR C. McCORMICK, OF CLEVELAND, OHIO, ASSIGNOR OF ONE-FOURTH TO JAMES E. MOYER, OF AKRON, OHIO, ONE-FOURTH TO SAMUEL K. HINE, OF GIRARD, OHIO, ONE-EIGHTH TO JOHN W. WRIGHT, OF YOUNGSTOWN, OHIO, AND ONE-EIGHTH TO WILLIAM CANFIELD, OF PITTSBURGH, PENNSYLVANIA.

MACHINE FOR FORMING ARTICLES OF PLASTIC MATERIAL.

1,268,984.     Specification of Letters Patent.     Patented June 11, 1918.

Application filed December 4, 1916. Serial No. 134,913.

*To all whom it may concern:*

Be it known that I, OSCAR C. McCORMICK, a citizen of the United States, residing at Cleveland, in the county of Cuyahoga and State of Ohio, have invented new and useful Improvements in Machines for Forming Articles of Plastic Material, of which the following is a specification.

This invention relates to improvements in machines for forming articles, such for instance, as cups, saucers, plates, etc., from plastic clay preparatory to the final drying and burning thereof. The primary object of the invention is to provide a simple, cheap and compact machine of the class named comprising a plurality of mold supports arranged to revolve orbitally to bring the various molds carried by said supports successively into operative position with respect to tools which are designed to fashion an article in each mold as it is brought into proper position with respect to said tools. The device is intended to be used in connection with a loading machine arranged to place the molds, each containing a batch of clay in the supports, and a device for removing the molds containing the formed articles from the supports and place them on a conveyer for transportation to a drying room; these devices are mechanisms, however, not forming any portion of this invention, and are not described or shown. Another object of the invention is to provide improved devices for spreading out or giving an initial or partial formation to a batch of clay in one mold and then completing the formation of the article by means of a different tool inserted in the same mold after the partial revolution of the carrier on which the mold is supported. The devices for initially shaping or fashioning a batch of clay and completing the formation of the article are so placed that the molds are successively brought into operative engagement or positioned with respect to the two forming tools during their orbital movement.

A further object of the invention is to provide an improved mechanism for orbitally revolving a plurality of mold supports, each equipped with a mold, successively into position to permit of the forming of an article in each mold, said mechanism arranged to hold each mold stationary with respect to its orbital movement and rotate it on its own axis during the forming operation, and then move all of the molds to bring the next succeeding mold into position with respect to the forming tools.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a perspective view of a device embodying this invention.

Fig. 2 is a vertical, central, sectional view of the device shown in Fig. 1.

Fig. 3, is a side elevation of the driving shaft, its supports and connected mechanism.

Fig. 4, is a side elevation of a gear employed in the device.

Fig. 5 is a perspective view of the upper portion of the mechanism for fashioning the batch of clay in the various molds.

Fig. 6 is a detailed view in side elevation of the means for rotating the molds during the forming operation.

Fig. 7 is a detail of the lower end used for ejecting the molds after the completion of the article.

Fig. 8 is a perspective view of a valve and its operating mechanism employed in the device.

Fig. 9 is a vertical, central, sectional view of the valve shown in Fig. 8 showing the valve in one position, and Fig. 10 is a similar view of said valve and casing therefor with the valve in a different position from that shown in Fig. 9.

Figure 1:
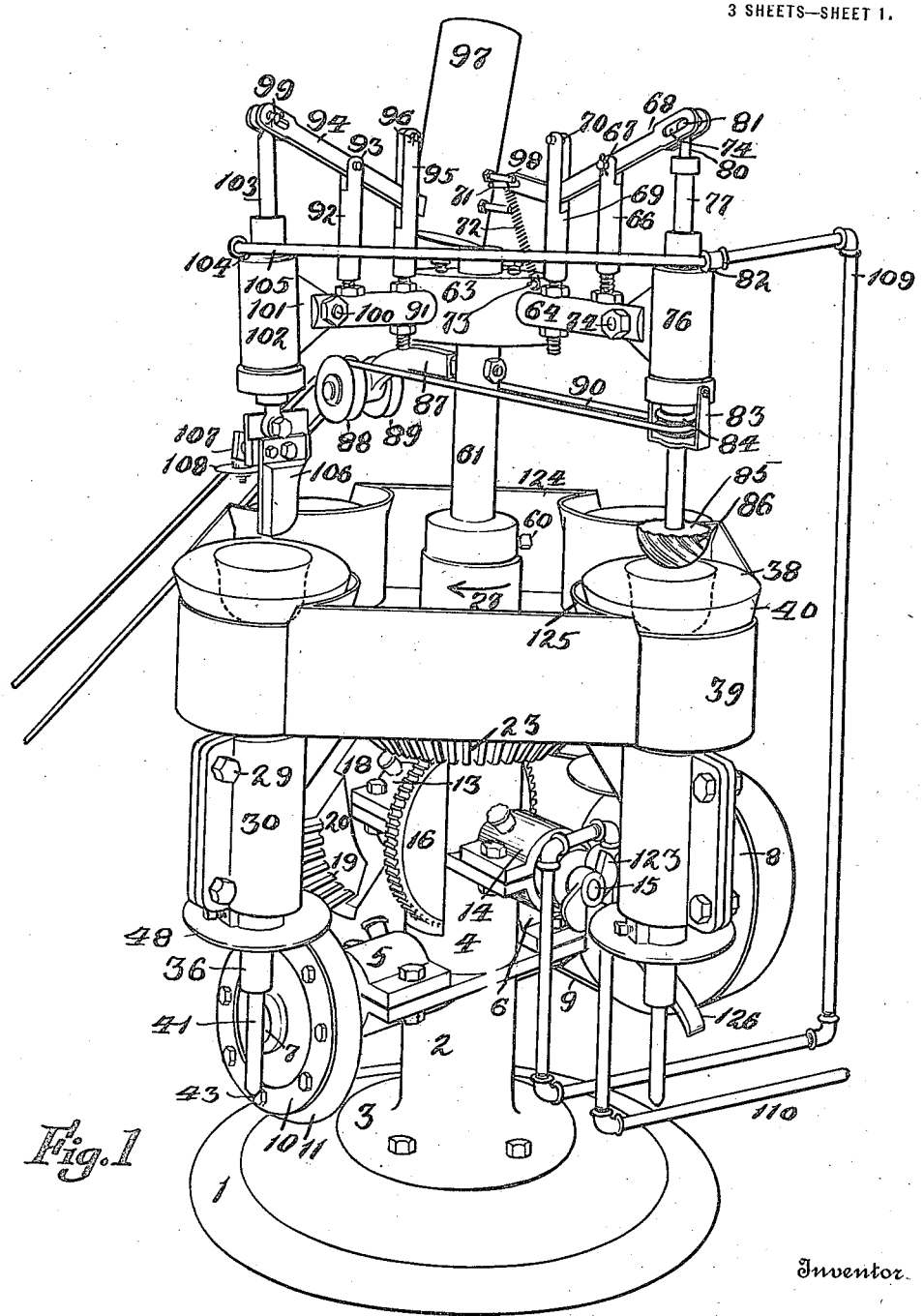

Referring to the drawings in detail the reference numeral 1 denotes a base on which is mounted an upright housing designated generally by the reference numeral 2 and comprising a foot 3 and a hollow casing 4. The housing 2 is provided with alined bearings 5 and 6, see Fig. 3 in which is mounted a driving shaft 7. The shaft 7 bears at one end a belt pulley 8 receiving motion from a belt 9 and at its opposite end is provided with a friction driving wheel 10 the face 11 of which is preferably conically fashioned. The shaft 7 within the housing 2 is provided with a worm 12. The housing 2 is provided with a pair of alined outwardly-extending bearings 13 and 14 extending transversely of the axis of the shaft 7. Rotatably mounted in the bearings 13 and 14 is a counter-shaft 15 on which is mounted a worm-wheel 16 adapted to mesh with the worm 12 and receive motion thereby. Fixedly mounted by some means, such for instance, as a key 17 on the shaft 15 is a broken bevel gear 18 shown best in Fig. 4 and comprising two distinct series of teeth 19, the two series being oppositely disposed to one another. Extending inwardly from and integral with the teeth 19 are two cam-shaped members 20 for a purpose to be later described. The upright portion 4 of the housing 2 is provided with an upwardly-extending, hollow, integral cylindrical portion 21 forming with the portion 4 a shoulder 22, and rotatably mounted on the cylindrical portion 21 and supported by the shoulder 22 is an inverted bevel-gear 23 supporting a revoluble carrier designated generally by the reference numeral 24 which is connected with said gear by some means, for instance, as screws, not shown. The carrier is provided with a plurality of radially-extending arms 26 and an upwardly-extending sleeve 27 surrounding the cylindrical portion 21 of the housing 2. The number of arms 26 extending on the carrier 24 is immaterial and in the drawings four of these arms are shown and as all are similar, it is thought a description of one will be sufficient for the understanding of them all. Each arm 26 terminates in a hollow enlargement 28 with a bifurcated outer portion, the furcations of which are adapted to be drawn toward each other by clamping means, such for instance, as bolts 29. Extending through the enlargement 28 is a vertical cylindrical chamber 30 in the upper end of which is a bearing 31 and in the lower portion a bearing 32 both of which are adapted to be held in position by the clamping action of the members 29. The bearings 31 and 32 have reversely arranged bearing surfaces numbered respectively 33 and 34. Mounted in the bearings 31 and 32 is a rotatable, hollow sleeve 35 having reversely arranged bearing surfaces adapted to coact with the bearing surfaces 33 and 34 for holding the sleeve from vertical movement. The lower end of the sleeve 35 is provided with a downwardly-extending tubular extension 36 and the upper end is threaded to be received in a threaded opening in the lower wall of a cup-shaped mold carrier 37 adapted to support a forming mold 38. The molds 38 are provided with lateral flanges 40 arranged to seat on the upwardly-extending side wall 39 of the mold carrier 37 and be held against independent rotation by frictional engagement with the carrier 37. In order to make the work or function of the spreading tool 85 efficient it is rotated at a high speed and as the mold 38 and the carrier 37 and its connected mechanism is of considerable weight, consequently when the spreader is in operation the slight frictional engagement of the spreader with the clay is not sufficient to rotate the mold and its carrier and if it is rotated slightly it is immaterial to the accomplishment of the function for which the spreader is employed. The interior of each mold is so fashioned as to impart a desired exterior configuration to the article to be formed therein. In the sleeve 35 is mounted a vertically shiftable rod 41 the upper end of which projects into the cavity of the mold carrier 37, and is there provided with a head 42. The lower end of each rod 41 is provided with a recess constituting a bearing for a friction reducing ball 43 for a purpose to be later described. The base 1 is provided with a threaded recess in which is mounted a tube-like member 44 containing a vertically shiftable plunger 45 normally shifted upwardly by a coil-spring 46. The upper end of the plunger 45 is provided with a head 47 the upper face of which constitutes a braking surface. Secured to the depending portion 36 of the sleeve 35 is an inverted frusto conically formed disk 48 of sufficient width to engage the braking surface on the head 47 as the arms 26 of the carrier move the mold supports orbitally to thereby arrest revolution of each disk 48 and each supporting the member 37.

The upright portion 4 of the housing 2 is provided with a laterally offset lug 50 through which extends a vertical opening constituting a bearing for a vertically shiftable pin 51. Extending between the lug 50 and the cap of the bearing 13 is a guiding pin 52. Vertically shiftably mounted on the guiding pin 52 is an arm 53 with an opening to receive the pin 51 which is secured thereto by a cross pin 54 so that the pin 51 and arm 53 reciprocate vertically in unison. Between the arm 53 and the cap of the bearing 13 is a coiled-spring 55 the normal tendency of which is to force the upper end of the pin 51 into recesses 56 accurately disposed in the under face of the gear 23 for locking the latter against revolution. Mounted on the free end of the arm 53 is a roller 57 arranged to be engaged by the inner faces of the cams 20 as the gear 18 revolves to thereby force the roller 57, arm 53 and pin 51 inwardly overcoming the spring 55 to withdraw the pin 51 from locking engagement with any one of the recesses 56 to permit revolution of the carrier 24.

Secured in the upper, open end of the member 21 by means of a set screw 60 or the like is a post or standard 61, to the upper portion of which is connected by means of a set screw 62, or the like, a head 63. Mounted in a suitable recess in the head 63 and extending radially with respect to the post 61 is an arm 64 held in position by some means such as a set screw 65. Mounted on the arm 64 is a post 66, the outer end of which is bifurcated and provided with a transverse pin 67 forming a fulcrum for a lever 68 pivotally mounted thereon. Adjacent to the post 66 is a post 69 the outer end of which is bifurcated providing furcations which are connected near their outer ends by a pin 70 which constitutes a stop or abutment to prevent undue upward movement of the lever 68. The lever 68 near the inner end thereof is provided with a pin 71 to which is connected a coiled spring 72 the opposite end of which is connected to an anchor 73 on the head 63. The opposite end of the lever is bifurcated to form two arms each of which is provided with a slot 74. The outer end of the arm 64 is bifurcated to provide two clamping jaws arranged to be drawn toward each other through the medium of a clamping bolt 74. Positioned between the furcation at the outer end of the arm 64 is a wing 75 formed integral with a vertically positioned cylinder 76, the upper and lower ends of which are provided with packing glands through which extends a piston rod 77 bearing a piston 78 within the cylinder 76. The upper end of the piston rod 77 is provided with a socket 79 in which is loosely mounted the head of a pin 80 the upper end of which bears a cross pin 81 engaging in the slotted ends of the lever 68. The upper end of the cylinder 76 is provided with an intake pipe 82. Secured to the lower end of the cylinder is a frame 83 serving as a supporting means for a sheave 84 fixedly mounted on the piston rod 77 below the cylinder 76. The lower end of the piston rod is provided with a spreading or shaping head 85 the outer face of which is provided with a plurality of superficial grooves 86 disposed in a direction reverse to the direction of rotation of the head 85. Secured to the upper portion of the post 61 below the head 63 is a bracket 87 on which are mounted two grooved pulleys 88 and 89 over which extends a cord-belt 90 from any source of power and which extends to and around the sheave 84 on the piston rod 77 for rotating the same on its own axis. The arm 64 with its connected mechanism will be so positioned that the axis of the piston rod 77 will be in vertical alinement with the axis of one of the mold supports at the time said mold support is at rest so that as the various mold supports, bearing the molds, are successively brought under the piston rod 77 they will, when at rest, be in proper vertical alinement with the head 85.

Also mounted on the head 63 and extending radially therefrom and at a right angle, with respect to the arm 64 is an arm 91, which bears an upright post 92 the upper end of which is bifurcated and provided with a pivot pin constituting a fulcrum for a lever 94. Also mounted on the arm 91 is a post 95 similar to the post 69. This post is provided with a cross pin 96 and the slot therein constitutes guiding means for the lever 94. Mounted on the inner end of the lever 94 is a counter weight provided with a pair of pins 98 spaced apart from each other and adapted to alternately engage the pin 71 on the lever 68 as the lever 94 is rocked upwardly and downwardly. The outer end of the lever 94 is bifurcated and the furcations thereof are provided with horizontally-alined slots 99 for a purpose to be later described. The outer end of the arm 91 is slotted and the ends are arranged to be clamped together by means of a bolt 100 for holding a wing 101 formed integral with a cylinder 102 through which extends a piston-rod 103 similar to the piston rod 77. The cylinder 102 is provided with packing of ordinary construction and the upper end is provided with an inlet 104 connected by means of a pipe 105 with the inlet 82 of the cylinder 76. The piston rod 103 within the cylinder 102 is provided with a piston of ordinary construction and attached to the lower end thereof is an article finishing and shaping tool 106 the outer face of which is of proper form to fashion an article in the mold 38, then in vertical registration therewith and impart thereto a desired or preferred integral configuration. Secured to the arm carrying the tool 106 is an arm 107 to which is attached a rotatable cutting disk 108 arranged to trim the upper face of each article formed in the mold 38 during the shaping operation and perform its function of trimming the upper edge of the article simultaneously with the fashioning of the article by the tool 106. The pipe 105 is connected with a pipe 109 and interposed in the pipe 109 is a valve, a more detailed description of which will follow and from the opposite side of the valve is a pipe 110 leading to some suitable supply containing compressed air or other fluid.

The valve just referred to is mounted on a bracket 111, secured to the bearing 14 of the shaft 15, and comprises a casing 112 provided with an exhaust outlet 113, an inlet 114 to which the supply pipe 110 is connected, and an outlet opening 115 with which the pipe 109 is connected. Within the casing 112 is a three-way or T valve 116 provided with a straight passage 117 extending therethrough and a communicating lateral passage 118. The valve 116 is provided outside of the casing 112 with a lug 119 from which extends an arm 120, the outer end of which is connected with a coiled spring 121 the opposite end of which is anchored to a bracket 122 on the bracket 111.

Mounted on the outer end of the shaft 15, where it projects outside of the bearing 14, are a pair of integral cams 123 so positioned as to engage the lug 119 and revolve the valve 116, to move the same to the position shown in Fig. 9 and the valve is returned to the position shown in Fig. 10 by the coiled spring 121.

In order to catch and retain any clay thrown out from the molds trimmed by the trimming tool 108 from falling onto the mechanism below the carrier 21 there is placed on the upper face thereof a pan 124 provided with side walls of such configuration as to conform to the general shape of the upper portion of the carrier 21 and provided with semi-circular shield-forming portions 125 arranged concentric with the mold carriers but spaced therefrom, and clearly shown in the drawings. The pan 124 is connected with the upper face of the carrier by set screws 126 and is supported and revolves with said carrier.

Secured to suitable supports 127 on the cap of the bearing 6 is a cam-bar 126ᵃ arranged to lie in the path of movement of the lower ends of the ejector rods 41 and to be encountered by them for raising these rods and thereby shifting the heads 42 thereof upwardly, for lifting the molds 38 out of their supports 37.

In machines of the present character, it is essential to relatively rotate the shaping head 85 and the mold carrier 37 at a comparatively high speed to procure the desired results and this may be most advantageously accomplished by rotating said head 85 instead of the mold support or carrier 37 together with its associated parts. As it is not essential to insure the head 85 against vibration or to retain the same in true center during the spreading operation, such vibration as will be caused by the rotation of said head 85 will not be detrimental. In other words, the wall of the article formed does not necessarily have to be of uniform thickness throughout after the operation of the spreading head thereon. However, it is extremely essential that the shaping tool 106 be at all times accurately centered with respect to the mold to thereby insure the article having a wall of even thickness throughout after operation thereon by the said tool 106. In view of this fact, it is desirable to rotate the mold carrier 37 and to retain the tool 106 stationary, the rotation of said mold carrier 37 during this operation being practical by reason of the fact that high speed of rotation of the mold is not then essential.

The operation of the device is as follows: Molds each provided with a batch of clay are placed in the supports of the device and are thereby brought successively into position under the head 85 of the piston rod 77 which is constantly revolved through the medium of the belt 90. At the instant that a mold containing a batch of clay ceases its orbital movement due to the interlocking of the pin 51 in one of the recesses 56, one of the cams 123 engages the lug 119 of the valve 116 and moves it to the position shown in Fig. 9, permitting an operating fluid to pass through the pipe 109 to the upper portion of the cylinder 76 which forces down the piston 78, and the piston rod 77 causing the revolving head 85 to spread the batch of plastic clay around the inner surface of the mold and the effect of this movement is further accentuated by the spirally arranged grooves 86 on the head 85.

Simultaneously with the downward movement of the piston rod 77 the operating fluid is carried by the pipe 105 to the upper portion of the cylinder 102 above the piston therein which forces downwardly the piston rod 103 and the forming tool 106 for imparting the final finishing operation to the interior of the article in the mold in operative position with respect thereto. It is contemplated that clay in the mold under the tool 106 will have been previously partially fashioned by the head 85 during a previous operation. The downward movement of the piston in the cylinder 101 rocks the lever 94, raising the weight 97 and moving the latter to its upper position as shown in Fig. 5. During the time that the tool 106 is at the lower end of its stroke and while it is in position to finish the interior of the article in the mold 38, the trimming tool 108 trims the upper edge of the article in the mold. By the time the trimming and finishing operations have been completed one of the cams 123 will have passed from engagement with the lug 109 permitting the spring 121 to move the valve 116 to the position shown in Fig. 10 thereby permitting the fluid in the two cylinders 101 and 76 and the pipes 105 and 109 to escape through the outlet opening 113. The escape of the fluid above the pistons in the two cylinders permits the counterweight 97 to raise both of the pistons with quick upward strokes due to the fact that the weight 97 is rigidly secured to the lever 94 and is provided with a pair of pins 98 which engage the pin 71 on the lever 68 to thereby rock the lever 68, thus moving both levers and pistons to the position shown in Fig. 1.

During the forming of the article in the mold by the shaping tool 106 the mold carrier which contains the mold in operative position thereto is rapidly rotated due to engagement of the conical disk 48 on the sleeve which bears the mold support in alinement with the shaping tool 106 and the friction-wheel 11 on the shaft 7, and which in turn is revolved by the belt 9 running over the pulley 8. The motion of the shaft 7 revolves the worm 12 which being in mesh with the worm-wheel 16 revolves the shaft 15. Mounted on this shaft 15 is the broken gear 19 which meshing with the spur-gear imparts a semi-revolution to the latter and to the carrier 21 for orbitally moving the mold supports about their common axis. The gear 23 and carrier 21 are locked fixedly against movement at each fractional revolution by means of the pin 51 engaging in one of the recesses 56 and the pin 56 is withdrawn from each of the recesses successively by the engagement of the roller 57 with the inner faces of the cams 20. As each mold carrier leaves the position it occupies under the finishing tool 106 it is rapidly revolving and each disk 48 encounters the upper face of the spring pressed head 47 which by frictional engagement therewith constitutes a brake for terminating the rapid rotation of the same on its own axis. During the orbital movement of the various mold supports about the device and after the completion or finishing of each article the lower end of each rod 41 each bearing a frictional roller 43 ride over the inclined cam bar 126 which raises each head 42 on each of the rods 41 and ejects the mold bearing the finished article from the support in which it has made its orbital movement. The molds with their finished articles are then removed by means not necessary here to describe. As each mold carrier leaves the position which it occupies during the fashioning of the article, the mold and carrier are ordinarily rapidly rotating and the disk 48 moves into engagement with the head 47 which constitutes a braking element for arresting further rotation of the mold and its carrier. During the orbital movement of each mold carrier after the forming and braking operation the lower end of the rod 41 bearing the friction reducing ball 43 engages and rides upwardly over the inclined cam bar 91 thereby raising each rod 41 causing the head 42 thereof to raise a mold 38 into position to be grasped by an unloading tool which forms no portion of this invention and is therefore not shown or described. It is contemplated that mechanism will be provided for supplying molds to the mold carrier each of the former provided with a batch of clay which is to be fashioned into a desired shape by the forming tools 85 and 106, when brought into position therefor.

It may be pointed out that the friction wheel 10 is constantly revolving and the various mold carriers are rotated on their own axes as the various disks 48 are brought into engagement therewith and the rotation of said mold carriers is arrested by the braking member 47. Also the molds in the various carriers are successively ejected from their carriers or are lifted into a position to be removed by means of the ejecting rods 41 engaging the upper surface of the cam bar 126.

Experience has shown that in the manufacture of plastic articles a finishing or final shaping tool such as 106 which is nonrotatable and is applied to a batch of clay which is not previously partially shaped results in the production of inferior ware due to the roughing up of the clay during the rapidly rotating of the mold in which the clay is placed but it has been found that if a preliminary or initial partial formation is imparted to the batch of clay so as to spread it evenly about the mold the effective operation of the finishing tool for the finishing operation is greatly increased and hence in order to save time and secure increased efficiency which is a primary object of the invention to provide a preliminary shaping spreader arranged to operate approximately simultaneously with the finishing tool and so disposed that when the spreader is operating on a batch of clay in one mold the finishing tool is simultaneously finishing a partially preformed batch in a coadjacent mold, thus saving time and always furnishing to the finishing tool a partial preformed batch of clay for engagement with the finishing tool. This is accomplished in the present invention by causing the spreader and finishing tool to reciprocate vertically simultaneously at the termination of each orbital partial revolution of the mold carrier.

I claim,

1. A device of the character described comprising a housing, a carrier mounted thereon, means to intermittingly revolve said carrier a definite fractional portion of a revolution, means to lock said carrier against movement at the termination of each partial revolution thereof, a plurality of rotatable mold supports on said carrier, a mold for a batch of clay mounted in each support, a rotatable spreader arranged to engage the batch of clay in one mold when the orbital movement thereof ceases, a shaping tool adapted to engage a previously spread batch of clay in another mold, means to rotate the mold support containing the mold in operative engagement with said shaping tool, said means being operative when the orbital movement of the carrier ceases, means to terminate the rotation of said mold support when the carrier resumes its orbital movement, means to independently rotate said spreader, and means for moving said spreader and forming tool downwardly to their operative positions.

2. A device of the character described comprising a housing, a carrier mounted thereon, means to intermittingly revolve said carrier a definite fractional portion of a revolution, means to lock said carrier against movement at the termination of each partial revolution thereof, a plurality of rotatable mold supports on said carrier, a mold for a batch of clay mounted in each support, a rotatable spreader arranged to engage the batch of clay in one mold when the orbital movement thereof ceases, a shaping tool adapted to engage a previously spread batch of clay in another mold, means to rotate the mold support containing the mold in operative engagement with said shaping tool, said means being operative when the orbital movement of the carrier ceases, means to terminate the rotation of said mold support when the carrier resumes its orbital movement, fluid operated means to move said spreader and forming tool to their lower operative positions.

3. A device of the character described comprising a housing, a carrier mounted thereon, means to intermittingly revolve said carrier a definite fractional portion of a revolution, means to lock said carrier against movement at the termination of each partial revolution thereof, a plurality of rotatable mold supports on said carrier, a mold for a batch of clay mounted in each support, a rotatable spreader arranged to engage the batch of clay in one mold when the orbital movement thereof ceases, a shaping tool adapted to engage a previously spread batch of clay in another mold, means to rotate the mold support containing the mold in operative engagement with said shaping tool, said means being operative when the orbital movement of the carrier ceases, means to terminate the rotation of said mold support when the carrier resumes its orbital movement, fluid operated means to move said spreader and forming tool to their lower operative positions, a supply pipe for fluid under pressure connected with the spreader and forming tool mechanism, a valve in said pipe, and means connected with the means for revolving said carrier adapted to move said valve to its open position at the termination of each partial revolution of said carrier.

4. A device of the character described comprising a housing, a carrier mounted thereon, means to intermittingly revolve said carrier a definite fractional portion of a revolution, means to lock said carrier against movement at the termination of each partial revolution thereof, a plurality of rotatable mold supports on said carrier, a mold for a batch of clay mounted in each support, a rotatable spreader arranged to engage the batch of clay in one mold when the orbital movement thereof ceases, a shaping tool adapted to engage a previously spread batch of clay in another mold, means to rotate the mold support containing the mold in operative engagement with shaping tool, said means being operative when the orbital movement of the carrier ceases, means to terminate the rotation of said mold support when the carrier resumes its orbital movement, fluid operated means to move said spreader and forming tool to their lower operative positions simultaneously, a pipe connected with a source of supply and also with the operating means for said spreader and forming tool, a valve in said pipe, a lug on said valve, a plurality of cams connected with the means for revolving said carrier and arranged to successively and intermittingly shift said valve to its open position upon the termination of a partial revolution of said carrier.

5. A device of the character described comprising a housing, a carrier mounted thereon, means to intermittingly revolve said carrier a definite fractional portion of a revolution, means to lock said carrier against movement at the termination of each partial revolution thereof, a plurality of rotatable mold supports on said carrier, a mold for containing a batch of clay mounted in each support, a rotatable spreader arranged to engage the batch of clay in one mold when the orbital movement thereof ceases, a shaping tool adapted to engage a previously spread batch of clay in another mold, means to rotate the mold support containing the mold in operative engagement with said shaping tool, said means being operative when the orbital movement of the carrier ceases, means to terminate the rotation of said mold support when the carrier resumes its orbital movement, two cylinders each of which is positioned above one of said molds when said molds are at rest with respect to their orbital movement, a piston rod extending through each of said cylinders, a piston on each piston rod, a spreader at the lower end of one of said piston rods, a forming tool at the lower end of the other piston rod, a pipe connecting said cylinders with a source of supply of fluid under pressure, a valve in said pipe, and means connected with the means for revolving said carrier arranged to shift said valve to its open position at the termination of each partial revolution of said carrier and thereby force said pistons and their connected mechanisms downwardly into operative position.

6. A device of the character described comprising a housing, a carrier mounted thereon, means to intermittingly revolve said carrier a definite fractional portion of a revolution, means to lock said carrier against movement at the termination of each partial revolution thereof, a plurality of rotatable mold supports on said carrier, a mold for a batch of clay mounted in each support, a rotatable spreader arranged to engage the batch of clay in one mold when the orbital movement thereof ceases, a shaping tool adapted to engage a previously spread batch of clay in another mold, means to rotate the mold support containing the mold in operative engagement with said shaping tool, said means being operative when the orbital movement of the carrier ceases, means to terminate the rotation of said mold support when the carrier resumes its orbital movement, two cylinders each of which is positioned above one of said molds when said molds are at rest with respect to their orbital movement, a piston rod extending through each of said cylinders, a piston on each piston rod, a spreader at the lower end of one of said piston rods, a forming tool at the lower end of the other piston rod, a pipe connecting said cylinders with a source of supply of fluid under pressure, a valve in said pipe, means connected with the means for revolving said carrier arranged to shift said valve to its open position at the termination of each partial revolution of said carrier and thereby force said pistons and there connected mechanisms downwardly into operative position, and means for moving said pistons and tools to their upper inoperative positions.

7. A device of the character described comprising a housing, a carrier mounted thereon, means to intermittingly revolve said carrier a definite fractional portion of a revolution, means to lock said carrier against movement at the termination of each partial revolution thereof, a plurality of rotatable mold supports on said carrier, a mold for a batch of clay mounted in each support, a rotatable spreader arranged to engage the batch of clay in one mold when the orbital movement thereof ceases, a shaping tool adapted to engage a previously spread batch of clay in another mold, means to rotate the mold support containing the mold in operative engagement with said shaping tool, said means being operative when the orbital movement of the carrier ceases, means to terminate the rotation of said mold support when the carrier resumes its orbital movement, two cylinders each of which is positioned above one of said molds when said molds are at rest with respect to their orbital movement, a piston rod extending through each of said cylinders, a piston on each piston rod, a spreader at the lower end of one of said piston rods, a forming tool at the lower end of the other piston rod, a pipe connecting said cylinders with a source of supply of fluid under pressure, a valve in said pipe, means connected with the means for revolving said carrier arranged to shift said valve to its open position at the termination of each partial revolution of said carrier and thereby force said pistons and their connected mechanisms downwardly into operative positions, and common means for raising said pistons and tools to their upper inoperative positions.

In testimony whereof I have hereunto set my hand.

OSCAR C. McCORMICK.